Patented Apr. 29, 1952

2,594,544

UNITED STATES PATENT OFFICE 2,594,544

PRODUCTION OF ACTIVATED CARBON FROM DISTILLERS MASH

Philip J. Elving, West Lafayette, Ind., Edward Shoemaker, Bernard L. Kabacoff and Irving Nagelburg, Philadelphia, Pa., assignors to Publicker Industries Inc., Philadelphia, Pa., a corporation of Pennsylvania No Drawing. Application June 11, 1947, Serial No. 754,074

6 Claims. (Cl. 252—425)

Our invention relates to a novel process for the production of activated carbon. More particularly, it is concerned with a method of producing highly active carbon from carbonaceous industrial wastes and other organic carbonizable matter.

Numerous methods have previously been devised for the production of various types of activated carbons, both for the purpose of securing activation thereof, and for the purpose of controlling the physical condition and structure of the resulting activated carbon. Certain of the methods previously employed involved the intimate mixing of cellulosic materials with a suitable inorganic activating agent followed by heating and leaching out the inorganic material. Based on this general procedure, a large amount of experimental work was done utilizing numerous nitrogenous organic materials, starches, sugars, cellulose, and other materials which were variously treated with a large number of inorganic reagents that were introduced into these materials and mixed with them, subjected to heating, and the inorganic matter wholly or partially removed by a leaching out operation.

One of the common materials employed in the preparation of active carbons has been the carbonaceous solids present in spent distillery mashes. Prior methods utilized in the preparation of active carbons from such materials generally involved concentrating the spent mash down to a volume such that the solids content amounted to about 80% of the residual matter, after which sulfuric acid or another suitable mineral acid was added thereto for the purpose of eliminating substances causing excessive expansion of the material when subjected to carbonization. The acidified mixture which also contained a suitable inorganic activator was then evaporated to dryness, after which it was placed in a carbonizing furnace. The carbonized product thus obtained was then processed in the customary manner.

Carbons produced in accordance with the process described immediately above, as well as those produced by other previous methods, have exhibited certain defects, however, which rendered them ineffective or impracticable as decolorizing and/or gas adsorbent carbons. Among the defects of active carbons formerly produced there may be mentioned their poor physical structure, i. e., inability to retain the form in which they were molded for any practical period of operation, and the low gas adsorptive properties per unit weight of carbon.

We have now discovered a procedure for the preparation of activated carbons free from the foregoing and other former defects. In accordance with the present invention, gas adsorbent carbon having excellent gas adsorption capacity and which can be shaped into forms having high mechanical strength, may be obtained by evaporating a mixture, containing carbonaceous solids, until the solids content of such mixture ranges from between about 25% to about 80% of the total. Thereafter, a suitable activator is added to the residue in an amount of from about 1% to 75%, based on the solids content thereof. This mixture is then further evaporated in the absence of mineral acid until a plastic mass is obtained, with suitable stirring or agitation being provided to prevent local overheating and to insure thorough mixing. The fluid to plastic mass thus obtained is then preferably poured into thin sheets or layers and the drying operation is completed at a temperature of from about 100° C. to about 250° C. The dried material is then ground by any suitable means after which the powdered product is mixed thoroughly with sufficient water to yield a suitably plastic mass, preferably with from between about 10% to about 35% of its weight of water. This plastic mass is then shaped and formed, e. g., extruded through a suitable die and cut to give a compact mass of the desired shape and size. The particles thus obtained are next dried at a temperature below 120° C. until the excess moisture which would cause swelling and sticking in the carbonizer is driven off, after which they are heated in a suitable carbonizing furnace in the absence of air, other than that originally present in the furnace, to a temperature between 600° C. to about 1200° C., the temperature being held at the desired maximum value until gas evolution has ceased. The carbonized particles are then suitably cooled by quenching in water and/or lowering the temperature of the surrounding zone. The carbonized product is then subjected to a series of washing operations which lower the ash content thereof. The washes used generally include water, an aqueous solution of a mineral acid, and water in the sequence given. The last water wash is continued until the effluent from the washing operation is neutral. The washings, if desired, may be either continuous or batch-wise. The carbonized particles thus obtained, after drying to remove excess water, are then ready for use.

A preferred embodiment of our novel process for the preparation of the gas adsorptive carbons of our invention, comprises concentrating a spent distiller's mash to a volume such that the solids content constitutes approximately 50% of the total residual matter. Thereafter, finely divided calcium sulfate, for example, in the form gypsum, is then added to the residual material in an amount corresponding to from about 20% to 30% by weight of the solids present. Thereafter this mixture is partially dehydrated by heating at a temperature of between about 140° C. and 160° C. The dried material thus obtained is ground to a mesh of about 100 after which it is mixed with approximately 20% of its weight of water, ethylene glycol, glycerol or the equivalent thereof, to produce a plastic mass. This mass is next extruded and cut to give the desired shape of particle, after which the product is dried at a temperature of about 60° C. to 70° C. The dried particles are then transferred to a carbonizing furnace and the temperature is increased to about 900° C. over a period of three hours. Gas evolution usually ceases after approximately ten minutes at the aforesaid temperature, after which it is generally preferable to allow the furnace to cool spontaneously to room temperature. The carbonized product thus obtained consists of about 40% carbon and about 60% calcium and other salts derived from the original fermentation material. The product is next washed with water until the effluent is neutral, after which it is treated with hot dilute hydrochloric acid, preferably of about 18% strength, and thereafter the product is washed with water until neutral. The carbonized material thus obtained is then dried at a temperature of between about 120° to 140° C. to give a product having extremely good mechanical strength and gas adsorption properties.

Activated carbons having excellent decolorizing properties, may also be prepared in accordance with our invention by concentrating a suitable mixture containing carbonaceous solids such as, for example, a spent molasses ethyl alcohol fermentation mash to a solids content amounting to from about 35% to 80% of the total, and preferably about 50% thereof. To this residual material is next added from between about 1% to 75%, and preferably between about 5% and 40%, of a suitable activator based on the weight of the solids of the original concentrate, together with a suitable flux material such as, for example, potassium carbonate, in an amount preferably equal to the quantity of carbonaceous solids present. This mixture is then placed in a carbonizer furnace and slowly heated to a temperature of from about 800° C. to 1000° C., and preferably around 900° C. After the evolution of gas has ceased, the furnace is allowed to cool spontaneously, and thereafter, the resulting carbonized product is washed with water to remove the flux material together with other water-soluble impurities present in the original concentrate. This solution may be further concentrated to recover the flux material and the latter used in subsequent runs for an indefinite period. The product washed in this manner is then heated while in contact with a suitable mineral acid to permit removal of the activator from the carbon. Thereafter, the latter is again washed with water until free of acid, yielding a second solution of a water-soluble salt which can be recovered and subsequently converted into a suitable carbon activator. The washed product is then dried at a temperature preferably not in substantial excess of 160° C., after which it is ready for use. As an alternative method for preparing the decolorizing carbons of our invention the mixture, consisting, preferably, of spent fermentation mash and activator, may be dried in the absence of the flux material, to a brittle mass at a temperature not substantially above 160° C., and preferably from about 130° C. to 150° C. This dried mass is then ground by any suitable means to a powder of about 100 mesh after which it is mixed with an aqueous slurry of fluxing agent in which the latter is present in an amount approximately equal to the weight of the dried mass. Thereafter, the mixture is placed in a suitable carbonizer furnace and when carbonization is completed, is processed in accordance with the method generally outlined above.

It is to be pointed out that contrary to the teachings of the prior art relative to the necessity for the presence of an agent such as sulfuric acid, capable of preventing excessive foaming during the carbonizing operation, we have found, as indicated by the foregoing description, that entirely satisfactory results can be secured by omitting such an agent. Thus, in the process of our invention, the concentrate containing carbonaceous solids can be mixed with suitable amounts of activator and fluxing agent, the resulting mixture dried to a brittle mass, and thereafter carbonized as previously described. By omitting the use of a foam depressant such as sulfuric acid which, if present, would destroy the flux, it is possible to add the activator and flux to the concentrate simultaneously, thereby eliminating the drying, grinding, and the final step of mixing the flux with the ground material prior to carbonization. Moreover, we have found that the presence of acid in mixtures employed in the preparation of gas adsorbent type carbons, i. e., those in which no fluxing agent is present, yields a mass that cannot be extruded because of its non-compressability and extremely low tensile strength. Hence, such mixtures result in the formation of a carbon that has no practical utility owing to the apparent lack of mechanical strength of the carbonized particles thus produced. Such particles tend to disintegrate very readily and under conditions of actual use become powdered, thereby rendering the adsorption of gas thereby a practical impossibility. It will likewise be apparent, that the omission of acid in the preparation of our activated carbons avoids equipment corrosion problems as well as obvious difficulties involved in handling such acids.

We have observed that an increase in decolorizing power of the carbon can be secured with a corresponding decrease in yield either by increasing the quantity of activator employed or by increasing the maximum carbonization temperature. Conversely, an increase in the yield at the expense of a part of the decolorizing power can be obtained either by decreasing the amount of activator used or the maximum carbonization temperature. We have further found that when the ratio of flux to the dried carbonaceous residue prior to carbonization is 1:1 or higher, no appreciable change in either yield or activity is obtained. However, at ratios below 1:1 the yield is observed to increase after a decrease down to 0.75:1, but the activity of the resulting carbon drops.

The flux employed in our process serves to thoroughly disperse the carbon during the carbonization step and to produce a carbon having the desired particle size. Fluxing agents that can be utilized for effecting the process of our invention may be any of those materials previously used for such purpose. Potassium carbonate, potassium sulfate, potassium sulfide, and the like are specifically mentioned as examples of typical fluxing agents suitable for use in our invention.

Likewise, the activators utilized in our invention may be any of those previously employed for the same purpose, a desirable property of such materials being that they yield gaseous decomposition products under the carbonization conditions used. We have found, however, that certain of the compounds of the elements in Group II of the Periodic Table are particularly suited for this purpose such as, for example, the oxides, hydroxides, phosphates, and sulfates of calcium and magnesium.

Mineral acids employed in removal of the activators from the carbonized product may be any whose anion portion is different from the anion portion of said activator or, in other words, any such acid may be utilized which is capable of converting the activator into a compound soluble in said acid.

The process involved in preparing the activated carbons of our invention results in yields of generally from 13% to 16% and is applicable to all types of fermentation residues derived from molasses and grain. Also, our process may utilize other organic carbonizable matter such as, for example, cellulose and other paper waste, coal and charcoal, peat, sawdust and other woody vegetable matter, carbohydrate material, nut shells, lignin and lignite materials, petroleum acid sludges, sewage waste, and the like.

The ability of the activated carbons of our invention to adsorb relatively large volumes of gas as compared to certain brands of carbon now on the market is illustrated in the table which follows.

This particular carbon was prepared without the use of a flux and in the absence of sulfuric acid, but was extruded through a suitable die and cut into pieces of convenient size prior to carbonization. The apparatus employed for measuring gas adsorbability was adapted from the apparatus described by deFranch (Ion 4, 843–45, 1944) and consisted of a small ground glass stoppered tube in which the carbon is placed, the tube itself being connected by a stopcock to a gas buret. The gas was confined in the buret by mercury, the level of which was controlled by a conventional leveling bulb. A gas sample inlet tube and a vacuum pump completed the apparatus. Normal butane was used as the test gas.

*Table I*

| Carbon Sample | Type of Carbon | n-Butane Adsorbed ml./g. of Carbon |
|---|---|---|
| Our Product G-3 | | 130 |
| Our Product G-4 | | 140 |
| Our Product G-5 | | 140 |
| Carbon A [1] | Solvent Recovery Grade | 97 |
| Carbon B [1] | Gas Mask Grade | 105 |
| Carbon C [1] | Solvent Recovery Grade | 115 |

[1] Commercially available.

Gas adsorbent carbons of our invention, such as those listed in the above table may be advantageously employed in various deodorizing operations as well as in water purification processes.

The decolorizing powers of the activated carbon produced in accordance with our invention, as compared to certain of the best decolorizing carbons now marketed, are shown by the data appearing in the table below. Our carbons were produced by effecting the carbonization steps with a product prepared in the absence of a mineral acid but with the aid of a flux. These runs were carried out utilizing the customary potassium permanganate tests, the potassium permanganate remaining in solution after treatment with the various samples of carbon being determined iodometrically.

| Carbon Sample | 3.2% KMnO$_4$ Solution Per Cent Decolorized |
|---|---|
| Our Product Run No. 29 | 79 |
| Our Product Run No. 30 | 54 |
| Carbon D [1] | 25 |
| Carbon E [1] | 15 |
| Carbon F [1] | 30 |
| Carbon G [1] | 35 |

[1] Commercially available.

From the foregoing description it will be apparent that the process of our invention is susceptible of numerous modifications without materially departing from the scope thereof. In general it may be said that any procedure embodying in principle the novel steps and conditions herein set forth is intended to come within the spirit of our invention.

What we claim is:

1. A process for the preparation of an activated carbon having good gas-adsorptive capacity which comprises concentrating a spent distiller's mash to a volume at which the solids content is about 25–80%, adding to the concentrated mash an activator comprising essentially a compound containing a Group II cation and being capable of decomposing under carbonizing conditions to give off a gas, said activator being added in an amount corresponding to about 20–30% by weight of the solids present in the mash, heating the mixture with agitation in the absence of mineral acid to remove the water, thereafter drying the material by heating at about 100–250° C., grinding the dried material thus obtained, mixing the ground material with about 10–35% of its weight of water to produce a more or less plastic mass, extruding and cutting the plastic mass to give individual particles of suitable shape, heating the particles at a temperature below about 120° C. to remove excess water, thereafter carbonizing by heating the particles at about 600–1200° C. until gas evolution has ceased, and thereafter cooling, washing and drying the material.

2. A process according to claim 1 wherein the distiller's mash is initially concentrated to a solids content of approximately 50%, and wherein the heating of the mash-activator mixture preliminary to drying is carried out at about 140–160° C., and wherein approximately 20% by weight of water is added to form the plastic mass, and wherein the preliminary heating of the extruded particles is carried out at about 60–70° C., and wherein the carbonizing is carried out by gradually raising the temperature of the dried extruded particles to about 900° C. over a period of about three hours and maintaining the maximum temperature until gas evolution has ceased, and wherein the cooled carbonized particles are first washed with water until they give a neutral effluent and are then washed with an aqueous solution of a mineral acid and are then again washed with water until they give a neutral effluent.

3. A process according to claim 1 wherein the activator is a member of the group consisting of the oxides, hydroxides, phosphates and sulfates of calcium and magnesium.

4. A process according to claim 1 wherein the activator is calcium sulfate.

5. A process according to claim 1 wherein the activator is calcium carbonate.

6. A process according to claim 1 wherein the activator is magnesium sulfate.

PHILIP J. ELVING.
EDWARD SHOEMAKER.
BERNARD L. KABACOFF.
IRVING NAGELBURG.

REFERENCES CITED

The following references are of record in the file of this patent:

UNITED STATES PATENTS

| Number | Name | Date |
|---|---|---|
| 29,560 | Belton | Aug. 14, 1860 |
| 197,834 | Designolle | Dec. 4, 1877 |
| 556,578 | Iseli | Mar. 17, 1896 |
| 1,308,826 | Weinrich | July 8, 1919 |
| 1,358,162 | Knopflmacher | Nov. 9, 1920 |
| 1,415,202 | Smith | May 9, 1922 |
| 1,520,801 | Bonnard | Dec. 30, 1924 |
| 1,643,031 | Riddle | Sept. 20, 1927 |
| 1,903,705 | Nikaido | Apr. 11, 1933 |
| 2,083,303 | Krczil | June 8, 1937 |
| 2,276,679 | Abbott | Mar. 17, 1942 |
| 2,441,125 | Berl | May 11, 1948 |
| 2,470,688 | Carter | Mar. 17, 1949 |

FOREIGN PATENTS

| Number | Country | Date |
|---|---|---|
| 14,224 | Great Britain | 1900 |
| 124,638 | Great Britain | Apr. 3, 1919 |
| 178,779 | Great Britain | Apr. 27, 1922 |